United States Patent
Hashimoto et al.

(10) Patent No.: US 10,628,226 B2
(45) Date of Patent: Apr. 21, 2020

(54) DEVICE CONTROL DEVICE, COMMUNICATION SYSTEM, AND CONTROL METHOD OF A DEVICE CONTROL DEVICE

(71) Applicant: SEIKO EPSON CORPORATION, Tokyo (JP)

(72) Inventors: Koji Hashimoto, Matsumoto (JP); Yoshinori Oshima, Matsumoto (JP); Dai Tanaka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 128 days.

(21) Appl. No.: 15/558,454

(22) PCT Filed: Feb. 5, 2016

(86) PCT No.: PCT/JP2016/000621
§ 371 (c)(1),
(2) Date: Sep. 14, 2017

(87) PCT Pub. No.: WO2016/147537
PCT Pub. Date: Sep. 22, 2016

(65) Prior Publication Data
US 2018/0052716 A1 Feb. 22, 2018

(30) Foreign Application Priority Data
Mar. 17, 2015 (JP) .................................. 2015-053034

(51) Int. Cl.
*G06F 9/50* (2006.01)
*H04W 76/10* (2018.01)
(Continued)

(52) U.S. Cl.
CPC ............ *G06F 9/5055* (2013.01); *G06F 9/546* (2013.01); *G06F 13/00* (2013.01); *G06Q 20/00* (2013.01);
(Continued)

(58) Field of Classification Search
CPC ........ G06F 9/5055; G06F 9/546; G06F 13/00; H04N 1/00; H04B 5/0056; G06Q 20/00;
(Continued)

(56) References Cited

U.S. PATENT DOCUMENTS 7,688,466 B2 * 3/2010 Manchester ......... G06K 15/005
358/1.15
2002/0020743 A1 2/2002 Sugukawa et al.
(Continued)

FOREIGN PATENT DOCUMENTS

JP 2002-063652 A 2/2002
JP 2008-210115 A 9/2008
(Continued)

OTHER PUBLICATIONS

International Search Report dated Apr. 26, 2016 in PCT/JP2016/000621 with English-language translation (4 pgs.).
(Continued)

*Primary Examiner* — Michael A Keller
(74) *Attorney, Agent, or Firm* — Foley & Lardner LLP

(57) ABSTRACT

A device control device with a near-field wireless communication capability can use the configuration having the near-field wireless communication capability to easily establish a communication path between an external device and another device. A device controller has a USB interface that connects to a USB device; a tag reader that reads, by near-field wireless communication, an IC tag storing an external device address, which is the address of a tablet terminal; and a device controller that sends a device control
(Continued)

device address, which is its own address, to the external device address read by the tag reader as the destination, and when, after sending the device control device address, establishing a communication path between the tablet terminal and a USB device is received from the tablet terminal, establishes a communication path between the tablet terminal and USB device.

8 Claims, 12 Drawing Sheets

(51) Int. Cl.
| | | |
|---|---|---|
| *H04W 84/10* | (2009.01) | |
| *G06F 13/00* | (2006.01) | |
| *G06Q 20/00* | (2012.01) | |
| *H04N 1/00* | (2006.01) | |
| *H04B 5/00* | (2006.01) | |
| *G06F 9/54* | (2006.01) | |
| *G06Q 20/32* | (2012.01) | |
| *G07G 1/12* | (2006.01) | |

(52) U.S. Cl.
CPC ......... *G06Q 20/327* (2013.01); *H04B 5/0056* (2013.01); *H04N 1/00* (2013.01); *H04W 76/10* (2018.02); *H04W 84/10* (2013.01); *G07G 1/12* (2013.01)

(58) Field of Classification Search
CPC .... G06Q 20/327; H04W 76/10; H04W 84/10; G07G 1/12
See application file for complete search history.

(56) References Cited

U.S. PATENT DOCUMENTS

| | | | |
|---|---|---|---|
| 2005/0210129 A1* | 9/2005 | Feng | G06F 3/1207 709/224 |
| 2011/0173338 A1 | 7/2011 | Chiu et al. | |
| 2014/0240776 A1* | 8/2014 | Suzuki | G06F 3/1296 358/1.15 |
| 2016/0034374 A1 | 2/2016 | Chiu et al. | |

FOREIGN PATENT DOCUMENTS

| | | |
|---|---|---|
| JP | 2011-170839 A | 9/2011 |
| JP | 2014-048677 A | 3/2014 |
| WO | WO-2007/026938 A1 | 3/2007 |

OTHER PUBLICATIONS

Extended European Search Report dated Oct. 5, 2018 in related European Appl. 16764371.7 (8 pgs.).

* cited by examiner

DEVICE CONTROL DEVICE, COMMUNICATION SYSTEM, AND CONTROL METHOD OF A DEVICE CONTROL DEVICE

CROSS REFERENCE TO RELATED APPLICATIONS

This application is a national stage entry of International Appl. PCT/JP2016/000621, filed Feb. 5, 2016; which claims priority to Japanese Appl. 2015-053034, filed Mar. 17, 2015; the contents of both of which are incorporated by reference herein in their entirety.

TECHNICAL FIELD

The present invention relates to a device control device, a communication system, and a control method of a device control device.

BACKGROUND

Information processing devices having a near-field wireless communication capability are known from the literature (see, for example, PTL 1).

CITATION LIST

Patent Literature

[PTL 1] JP-A-2014-48677

SUMMARY OF INVENTION

Technical Problem

A device control device that can connect to an external device and another device, open a communication path between the external device and the other device, and enable data communication between the devices, is also known. The task of opening a communication path between an external device and other device, and enabling data communication between those devices, is difficult with the device control device according to the related art, and the ability to easily establish a communication path has been needed. More particularly, when a device having a near-field wireless communication capability such as the information processing device described in PTL 1 is provided with functionality for connecting a device and made to function as a device control device, the ability to use the configuration having a near-field wireless communication capability to easily open a communication path between an external device and a connected device through the device control device has been desired.

The present invention is directed to this problem, and an objective of the invention is to enable a device control device having a near-field wireless communication capability to use the configuration having the near-field wireless communication capability to easily establish a communication path between an external device and another device.

Solution to Problem

To achieve the foregoing objective, a device control device according to the invention has a device connector that connects a device; a reader that reads, by near-field wireless communication, an IC tag storing an external device address, which is the address of an external device; and a controller that sends a device control device address, which is its own address, to the external device address that was read by the reader as the destination, and when, after sending the device control device address, a request to establish a communication path between the external device and the device is received from the external device, establishes a communication path between the devices.

A device control device with a near-field wireless communication capability thus comprised can easily establish a communication path between an external device and another device using the configuration having the near-field wireless communication capability.

Furthermore, the controller of the device control device of the invention, after establishing the communication path, sends data received from the external device for controlling the device to the device, and sends data received from the device to the external device.

This configuration enables communicating data through the communication path by asynchronous bi-directional communication between the external device and device.

Furthermore, in the device control device of the invention, the device has a print unit with capability of printing on recording media; and the controller, after establishing the communication path, sends to the print unit print control data received from the external device instructing printing specific information on the recording medium.

This configuration enables the external device to send print control data by the established communication path and control the print unit.

Furthermore, in the device control device of the invention, the device has a reader with a reading capability; and the controller, after establishing the communication path, sends device data based on a read result received from the reader to the external device.

When reading is done by the reader, this configuration enables the external device to acquire device data based on the read result through the communication path and execute an appropriate process.

To achieve the foregoing objective, a communication system according to the invention has an external device having an IC tag on which an external device address is recorded; and a device control device including a device connector that connects a device; a reader that reads, by near-field wireless communication, an external device address recorded on an IC tag; and a controller that sends a device control device address, which is its own address, to the external device address that was read by the reader as the destination, and when, after sending the device control device address, establishing a communication path between the external device and the device is requested from the external device, establishes a communication path between the devices.

A device control device with a near-field wireless communication capability thus comprised can easily establish a communication path between an external device and another device using the configuration having the near-field wireless communication capability.

To achieve the foregoing objective, a communication system according to the invention has a remote desktop server that provides a remote desktop; a remote desktop client including an IC tag recording an external device address, which is its own address; and a device control device including a device connector that connects a device; a reader that reads, by near-field wireless communication, an external device address recorded on the IC tag; and a controller that, based on the external device address read by the reader, acquires the address of the remote desktop server by a specific method, sends a device control device address, which is its own address, to the acquired address of the remote desktop server as the destination, and when, after sending the device control device address, establishing a communication path between the remote desktop server and the device is requested from the remote desktop server, establishes a communication path between these devices.

A device control device with a near-field wireless communication capability thus comprised can use the configuration having the near-field wireless communication capability to easily establish a communication path between a remote desktop server as an external device and a device.

To achieve the foregoing objective, a communication system according to the invention has a remote desktop server that provides a remote desktop; a remote desktop client including an IC tag recording the address of the remote desktop server; and a device control device including a device connector that connects a device; a reader that reads, by near-field wireless communication, the address of the remote desktop server recorded on the IC tag; and a controller that sends a device control device address, which is its own address, to the address of the remote desktop server read by the reader as the destination, and when, after sending the device control device address, establishing a communication path between the remote desktop server and the device is requested from the remote desktop server, establishes a communication path between these devices.

A device control device with a near-field wireless communication capability thus comprised can use the configuration having the near-field wireless communication capability to easily establish a communication path between a remote desktop server as an external device and a device.

To achieve the foregoing objective, another aspect of the invention is a control method of a device control device that connects to a device, including reading, by near-field wireless communication, an IC tag recording an external device address, which is the address of an external device; sending a device control device address, which is its own address, to the external device address that was read as the destination; and when, after sending the device control device address, establishing a communication path between the external device and the device is requested from the external device, establishing a communication path between the devices.

A device control device with a near-field wireless communication capability thus comprised can easily establish a communication path between an external device and another device using the configuration having the near-field wireless communication capability.

Advantageous Effects of Invention

The configuration of the invention enables a printing device with a near-field wireless communication capability to use the configuration of the near-field wireless communication capability to easily establish a communication path between an external device and a device.

DESCRIPTION OF EMBODIMENTS

Embodiments of the invention are described below with reference to the accompanying figures.

Embodiment 1

Figure 1:
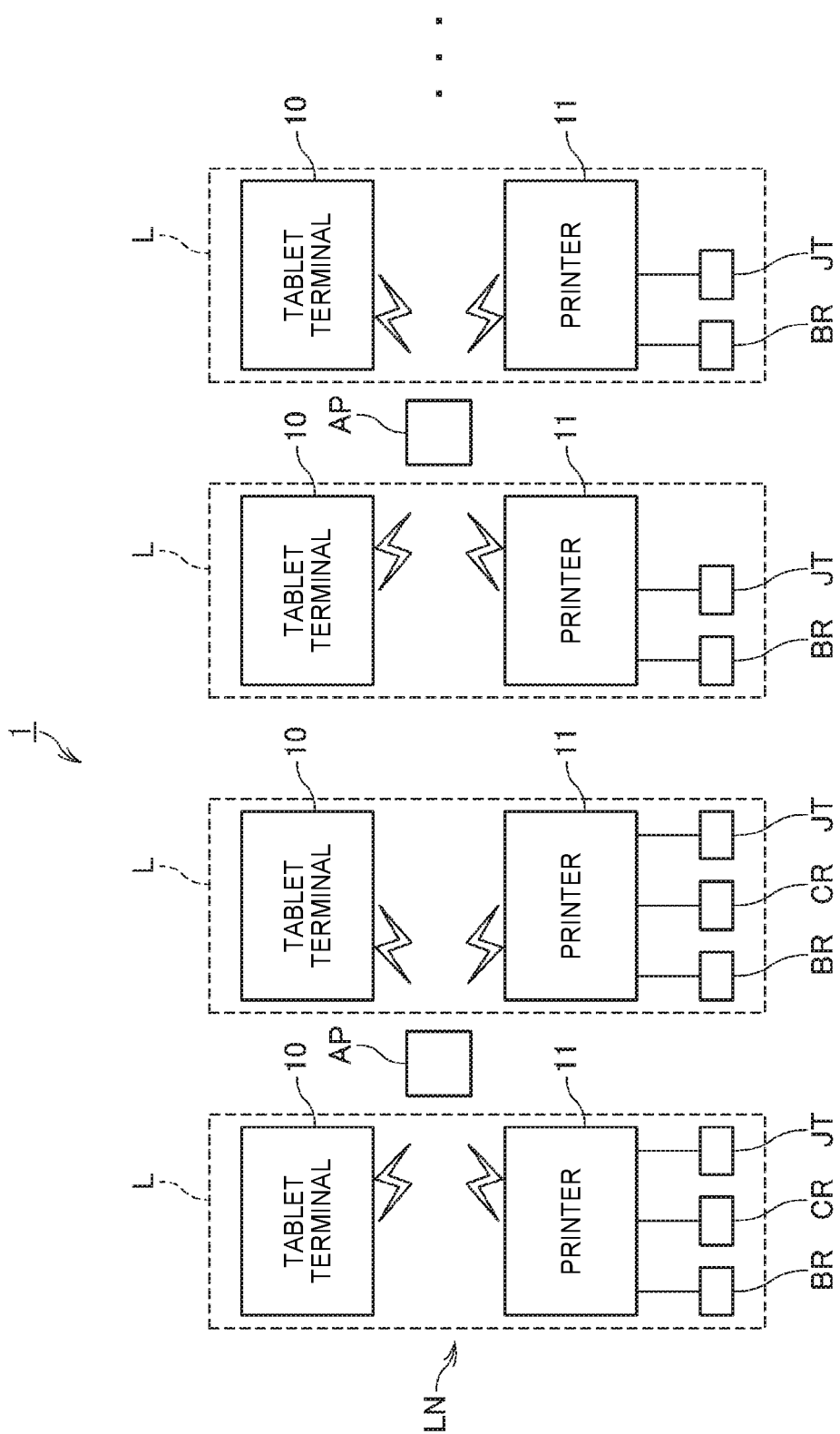
FIG. 1 illustrates a POS system according to a first embodiment of the invention.

FIG. 1 illustrates a POS (Point of Sales) system 1 (communication system) according to a first embodiment of the invention.

The POS system 1 is a system used in retail stores including shopping centers, department stores, and convenience stores, and businesses such as restaurants, coffee shops, bars, and other food service businesses.

The POS system 1 has functions for processing sales transactions appropriately to the product or service purchased by a customer, and printing sales receipts corresponding to the transaction, at a checkout counter L in the business.

A business where the POS system 1 is deployed has a checkout counter L where customer transactions are processed. A printer 11 capable of producing receipts according to the transactions is disposed at the checkout counter L. A tablet terminal 10 is assigned to the checkout clerk that processes transactions at the checkout counter L. The printer 11 and tablet terminal 10 communicate wirelessly through a local area network LN configured with an access point AP.

One or more transaction processing devices (devices) are connected to the printer 11.

The transaction processing devices are USB devices used at the checkout counter L during a transaction. In this embodiment, the transaction processing devices include at least a barcode reader BR (reading device), a credit card reader CR (reading device), and an automatic change machine JT.

The barcode reader BR is a reader for optically reading barcodes from products and product packaging.

The credit card reader CR is a reader for magnetically reading customer credit cards.

The automatic change machine JT has a cash receiver to which cash is inserted, a cash dispenser that dispenses change, and a cash storage unit for storing cash. When money for a transaction is inserted to the cash receiver, the automatic change machine discharges the appropriate change from the cash dispenser.

The same types of transaction processing devices are not necessarily installed at all of the plural checkout counters L.

For example, a credit card reader CR may be installed to the printer 11 at a checkout counter L where both cash and credit card payments can be accepted. On the other hand, a credit card reader CR may not be installed to the printer 11 at a checkout counter L where only cash payments are accepted.

The tablet terminal 10 is a tablet computer.

The tablet terminal 10, as described below, provides a specific user interface to the checkout clerk for processing transactions at the checkout counter L. The checkout clerk inputs to the user interface appropriately to the transaction, and reads information related to the transaction presented on the user interface. The tablet terminal 10 also controls the printer 11 to produce a receipt appropriately to the transaction at the checkout counter L. The receipt produced by the printer 11 is then given to the customer.

Figure 2:
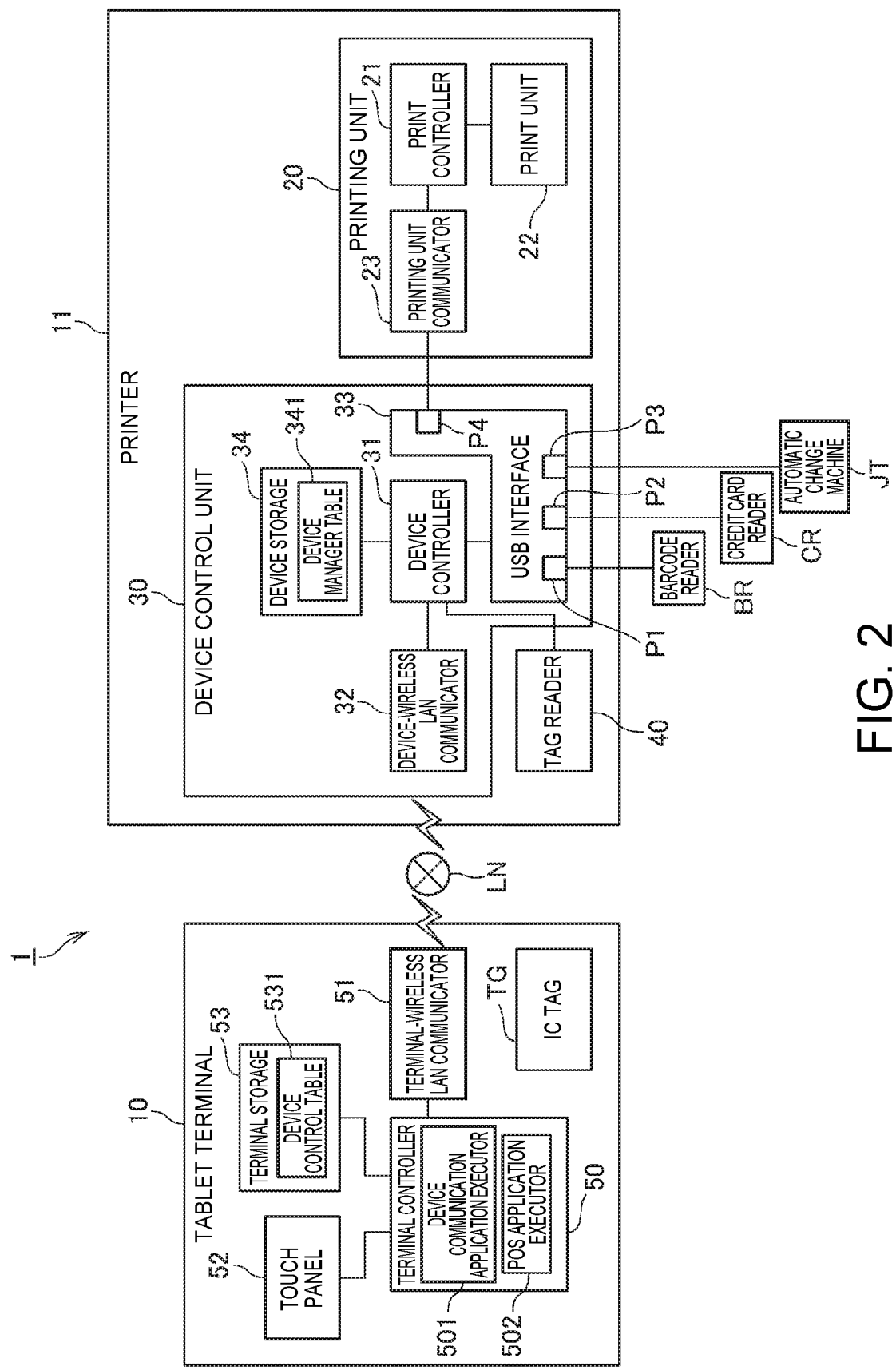
FIG. 2 is a block diagram illustrating the functional configuration of devices in the POS system.

FIG. 2 is a block diagram showing the functional configuration of a tablet terminal 10 and printer 11 in the POS system 1.

The printer 11 is a thermal printer that prints images by forming dots on roll paper by a thermal head.

As shown in FIG. 2, the printer 11 has a printing unit 20 and a device control unit 30 (device control device).

The printing unit 20 is a device with a printing capability, and as shown in FIG. 2, has a print controller 21, print unit 22, and printing unit communicator 23.

The print controller 21 has a CPU, ROM, RAM, and other peripheral circuits not shown, and controls the printing unit 20 by means of hardware and software, such as the CPU executing a control program stored in ROM.

The print unit 22 has a print mechanism, conveyance mechanism, and cutter mechanism.

The print mechanism includes the mechanisms for printing images by forming dots on roll paper, including a thermal line head and a head drive circuit that drives the thermal head.

The conveyance mechanism includes the devices for conveying the roll paper, including a conveyance roller, conveyance motor that drives the conveyance roller, and a motor drive circuit that drives the conveyance motor.

The cutter mechanism includes the devices for cutting the roll paper, including a cutter unit, a cutter drive motor that moves the movable knife of the cutter unit, and a motor drive circuit that drives the cutter drive motor.

The printing unit communicator 23 has a USB controller, and communicates by USB with the device control unit 30 as controlled by the print controller 21.

In relation to the device control unit 30, the printing unit 20 functions as a USB device to the device control unit 30 operating as the USB host.

The device control unit 30 is a USB device server that relays communication between USB devices (transaction processing devices and the printing unit 20) connected to the device control unit 30.

As shown in FIG. 2, the device control unit 30 has a device controller 31 (controller), a device-wireless LAN communicator 32, USB interface 33 (device connector), and device storage 34.

The device controller 31 has a CPU, ROM, RAM, and other peripheral circuits not shown, and controls the device control unit 30 by means of hardware and software, such as the CPU executing a control program stored in ROM.

The device-wireless LAN communicator 32, as controlled by the device-wireless LAN communicator 32, communicates according to the communication protocol of the local area network LN with devices (including the tablet terminal 10) connected to the network.

The USB interface 33 has an interface board with multiple (in this embodiment, four) USB ports P1 to P4 conforming to the USB protocol, and a USB controller included on the interface board. The USB interface 33, as controlled by the device controller 31, communicates with USB devices (including the transaction processing devices, and printing unit 20) connected by USB cables to USB port P1 to USB port P4.

In the example in FIG. 2, the barcode reader BR is connected to USB port 1, the credit card reader CR to USB port 2, the automatic change machine JT to USB port 3, and the printing unit 20 to USB port 4.

Unless differentiating therebetween below, USB ports P1 to P4 are referred to as simply USB port P.

Furthermore, the device type of the barcode reader BR is referred to below as "device type: barcode reader." The device type of the credit card reader CR is referred to below as "device type: credit card reader." The device type of the automatic change machine JT is referred to below as "device type: automatic change machine." And the device type of the printing unit 20 is referred to below as "device type: printing unit."

The device storage 34 has memory and stores data.

As shown in FIG. 2, the printer 11 has a tag reader 40 (reader) for reading data from an IC tag described below. The tag reader 40 has an antenna for sending and receiving wireless signals to and from the IC tag TG, and an RF transceiver circuit, communicates by near-field wireless communication with the IC tag TG, reads data recorded on the IC tag TG, and outputs to the device controller 31 of the device control unit 30.

The tablet terminal 10 is a tablet computer having a touch panel 52 on the front.

As shown in FIG. 2, the tablet terminal 10 has a terminal controller 50, terminal-wireless LAN communicator 51, touch panel 52, and terminal storage 53.

The terminal controller 50 has a CPU, ROM, RAM, and other peripheral circuits not shown, and controls the tablet terminal 10 by means of hardware and software, such as the CPU executing a control program stored in ROM.

Two applications are installed on the tablet terminal 10, a device communication application and a POS application.

The terminal controller 50 functions as a device communication application executor 501 by reading and running the device communication application.

The terminal controller 50 also functions as a POS application executor 502 by reading and running the POS application.

The functions and processes based on the functions of the device communication application executor 501 and POS application executor 502 are described further below.

The terminal-wireless LAN communicator 51 communicates, as controlled by the terminal controller 50, according to a communication protocol compatible with the local area network LN, with devices (including the printer 11) connected to the network.

The touch panel 52 combines an LCD panel or other type of display panel, and a touch sensor overlaid to the display panel. The display panel displays images as controlled by the terminal controller 50. The touch sensor detects touch operations and outputs to the terminal controller 50. The terminal controller 50 then executes processes appropriate to the touch operation.

The terminal storage 29 has memory and stores data.

An IC tag TG is disposed to the tablet terminal 10. The IC tag TG is disposed to the tablet terminal 10 by being adhesively affixed at a specific location on the back of the case of the tablet terminal 10, or by being housed inside the case of the tablet terminal 10.

The IC tag TG is a passive IC tag TG having an antenna for receiving wireless signals sent by the tag reader 40, and drives the IC by power induced by the antenna. Any desired near-field wireless communication standard may be used in the IC tag TG.

To read data from the IC tag TG, the tag reader 40 of the printer 11 sends a carrier wave of a specific frequency, and sends a detection signal superimposed on the carrier wave. When electromotive force is induced in the antenna of the IC tag TG by the carrier wave transmitted by the tag reader 40, this electromotive force turns the IC of the IC tag TG on, the IC tag TG then receives the detection signal, and sends a signal responding to the detection signal. When the tag reader 40 receives the response signal sent by the IC tag TG, the tag reader 40 continues outputting the carrier wave, sets the IC tag TG as the target for reading data, and sends a signal signaling the start of data reading. When the tag reader 40 then continues outputting the carrier wave, wireless signals are sent and received between the tag reader 40 and the IC tag TG by the specific near-field wireless communication standard, and data recorded in the IC tag TG is read.

In this embodiment, the IC tag TG disposed to one tablet terminal 10 stores data (referred to below as the external device address data) identifying the IP address (referred to below as the external device address) of that one tablet terminal 10.

As described above, multiple USB devices, including transaction processing devices and a printing unit 20, are connected to the device control unit 30.

In this embodiment, before a transaction is processed at a checkout counter L, a communication path is opened between the tablet terminal 10 and each USB device by the device control unit 30, enabling data to be sent and received between the tablet terminal 10 and each USB device by asynchronous bi-directional communication. In this embodiment, a communication path is a logical path on which data is sent and received using the USB protocol and procedures.

Conventionally, a complicated task such as described below is required to establish a communication path between the tablet terminal 10 and USB devices connected to the device control unit 30.

That is, the user instructs the tablet terminal 10 to search for a device control unit 30 connected to the local area network LN. In response to the user command, the tablet terminal 10 broadcasts a specific command requesting a response to the one or plural device control units 30 connected to the local area network LN. In response to receiving this specific command, each device control unit 30 sends an identifier identifying itself (such as information indicating the device name) to the tablet terminal 10. The tablet terminal 10 then presents a list of the identifiers received from the one or plural device control units 30 connected to the local area network LN in a specific user interface, and prompts the user to select one identifier from the list of identifiers.

After determining the identifier of the device control unit 30 connected to the device for which establishing a communication path with the tablet terminal 10 is desired, the user then selects the desired identifier from the list of identifiers. The tablet terminal 10 then exchanges the required data with the device control unit 30 identified by the selected identifier, and establishes a communication path with that USB device by functions of the device control unit 30.

The device control unit 30 according to this embodiment of the invention, however, can easily establish a communication path between the tablet terminal 10 and each USB device by executing the process described below.

Figure 3:
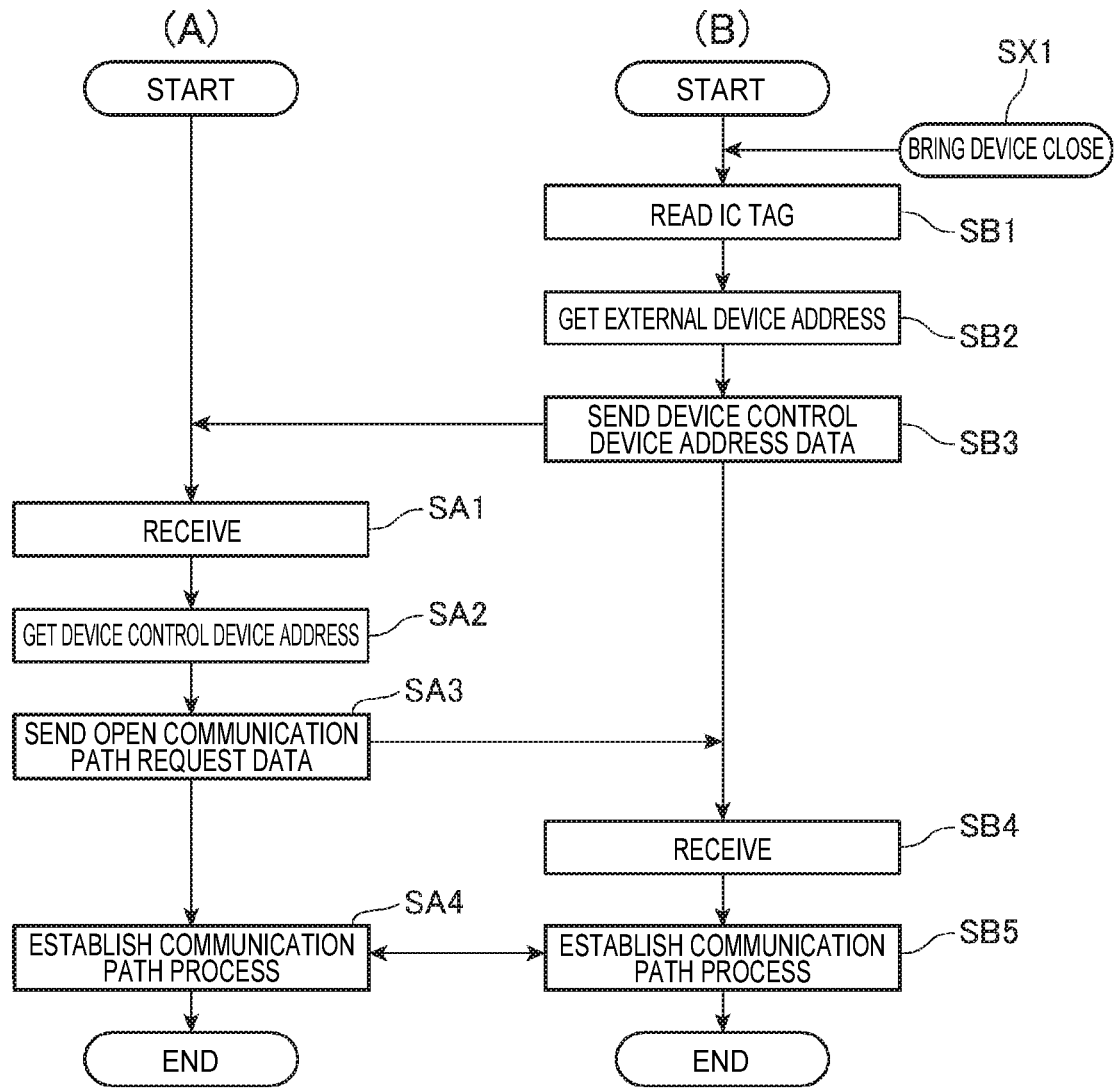
FIG. 3 is a flow chart of tablet terminal and device control unit operation.

FIG. 3 is a flow chart of the operation of the tablet terminal 10 and device control unit 30 when opening a communication path between the tablet terminal 10 and the USB device connected to the device control unit 30. Column (A) shows the operation of the tablet terminal 10, and (B) shows the operation of the device control unit 30.

To open a communication path between the tablet terminal 10 and the USB device connected to the device control unit 30, the checkout clerk, the user in this example, performs the following task. This task is performed when the business opens for the day, for example.

Specifically the checkout clerk turns on the tablet terminal 10 assigned to the clerk, and starts the device communication application installed on the tablet terminal 10. The checkout clerk also goes to the checkout counter L the clerk is assigned to, and holds the tablet terminal 10 near the printer 11, that is, within the near-field communication range of the IC tag TG and the tag reader 40 (step SX1).

To open a communication path between the tablet terminal 10 and the USB device connected to the device control unit 30, the checkout clerk (user) simply performs this simple task.

As shown in FIG. 3 (B), when the tablet terminal 10 is near the printer 11, the tag reader 40 of the printer 11 communicates by near-field wireless communication with the IC tag TG of the tablet terminal 10, reads the external device address data from the IC tag TG, and outputs to the device controller 31 (step SB1).

Based on the external device address data input from the tag reader 40, the device controller 31 acquires the external device address (step SB2).

Next, the device controller 31 sends device control device address data to the external device address acquired in step SB2 as the destination (step SB3).

Device control device address data is data indicating the IP address of the device control unit 30 (referred to below as the device control device address).

In step SB3, the device control unit 30 communicates by according to a specific communication protocol, such as TCP, with the device communication application executor 501, and opens a connection (referred to below as the device-to-device connection) according to the specific communication protocol. The device control unit 30 then sends the device control device address data through the open device-to-device connection.

Thereafter, communication between the device control unit 30 and the device communication application executor 501 uses the device-to-device connection that was established.

As shown in FIG. 3 (A), the device communication application executor 501 of the terminal controller 50 of the tablet terminal 10 controls the terminal-wireless LAN communicator 51 to receive the device control device address data (step SA1).

Next, the device communication application executor 501, based on the received device control device address data, acquires the device control device address (the IP address of the device control unit 30) (step SA2).

Next, the device communication application executor 501 sends open communication path request data to the device control device address (step SA3).

The open communication path request data is data requesting opening a communication path to the USB device connected to the device control unit 30.

As shown in FIG. 3 (B), the device controller 31 of the device control unit 30 controls the device-wireless LAN communicator 32 to receive the open communication path request data (step SB4).

Next, the device controller 31, based on the open communication path request data received in step SB4, communicates with the device communication application executor 501 to execute the establish communication path process (step SA4, step SB5).

In the establish communication path process of step SA4 and step SB5, the following process is executed by the device controller 31 and device communication application executor 501.

A device manager table 341 is stored in the device storage 34 of the device control unit 30. The device manager table 341 is a table for managing the USB devices connected to the device control unit 30. For each connected USB device, the device manager table 341 relationally stores the vendor ID, product ID, information indicating the device name (referred to below as the device name information), information indicating the device type (referred to below as the device type information), and port number information indicating the port number of the USB port to which the USB device is connected.

When a USB device is physically connected to a USB port P, the device controller 31 communicates with the USB device according to the method of the USB standard, and acquires the vendor ID, product ID, device name information, and device type information. Next, the device controller 31 generates a record in the device manager table 341, and in the generated record stores the acquired information relationally to the port number information indicating the port number of the USB port to which the USB device is connected.

Note that when a USB device is disconnected, the device controller 31 deletes the record related to that USB device from the device manager table 341.

In the establish communication path process of step SA4 and step SB5, the device controller 31 sends the device manager table 341 stored in the device storage 34 to the device communication application executor 501.

Based on the received device manager table 341, the device communication application executor 501 stores a table of the same content as the received table as a device control table 531 in the terminal storage 53.

Thereafter, the device communication application executor 501 communicates with the USB devices through the device controller 31 based on the device control table 531. As a result, a communication path is established between the device communication application executor 501 and the USB devices connected to the device control unit 30, and the tablet terminal 10 and USB devices can send and receive data by asynchronous bi-directional communication.

More specifically, to control one USB device, the device communication application executor 501 references the device control table 531 to acquire the port number of the USB port to which the one USB device to control is connected. Next, the device communication application executor 501 adds the acquired port number information to the control data for controlling the USB device, and sends the control data through the device-to-device connection to the device controller 31.

The device controller 31 receives the control data through the device-to-device connection, and acquires the port number information added to the control data. Next, the device controller 31 sends the control data to the one USB device through the USB port P of the port number identified by the acquired port number information according to the appropriate USB standard. The one USB device then receives the control data and executes a process based on the control data.

When data (referred to below as device data) is received from one connected USB device, the device controller 31 adds to the device data the port number information indicating the port number of the USB port P to which the one USB device is connected. Next, the device controller 31 sends the device data through the device-to-device connection to the device communication application executor 501.

The device communication application executor 501 receives the device data through the device-to-device connection, and acquires the port number information added to the received device data. Next, the device communication application executor 501 references the device control table 531, and acquires the device type information corresponding to the acquired port number information. The acquired device type information is information indicating the device type of the USB device that sent the device data. Next, the device communication application executor 501 outputs the device data using a specific API to the application (an application that processes device data sent by a device of that device type) corresponding to the device type indicated by the acquired device type information. The application processes the device data.

As described above, the device communication application executor 501 can, at the desired time, send control data to a specific USB device, and execute a process based on the control data. The device data sent by the USB device is also sent to the device communication application executor 501, and output by the device communication application executor 501 to the appropriate application.

More specifically, a logical communication path is established between the device communication application executor 501 and each USB device, and data is sent and received between the device communication application executor 501 and USB devices by means of asynchronous bi-directional communication.

In the example in FIG. 2, communication path KT1 is established between the device communication application executor 501 and barcode reader BR; communication path KT2 is established between the device communication application executor 501 and credit card reader CR; communication path KT3 is established between the device communication application executor 501 and automatic change machine JT; and communication path KT4 is established between the device communication application executor 501 and printing unit 20.

In this embodiment, an IC tag TG is disposed to the tablet terminal 10, and capability for reading the IC tag TG is disposed to the printer 11. The reason for this is described below.

Specifically, general-use computers may be used as the tablet terminals 10 in the POS system 1. Using general-use computers as the tablet terminals 10 enables reducing the cost of constructing the system and the cost of maintaining the system. However, when a general-use computer is used as the tablet terminal 10, the tablet terminal 10 may not have the ability to read an IC tag TG. Furthermore, while the capabilities of the tablet terminal 10 can be increased by externally attaching a device with the ability to read IC tags TG to the tablet terminal 10, this detracts from the portability that is a feature of the tablet terminal 10, and is not desirable.

The printer 11 according to this embodiment, however, has a device control unit 30. Therefore, even if the ability to read IC tags TG is not built in to the printer 11 itself, the ability to read IC tags TG can be reliably added to the printer 11 by connecting a USB device with the desired functionality.

As a result, this embodiment of the invention disposes the IC tag TG on the tablet terminal 10 side, and the ability to read the IC tag TG on the printer 11 side.

Operation of devices in the POS system 1 during a transaction at the checkout counter L is described next.

Before starting the transaction, the checkout clerk opens a communication path between the tablet terminal 10 (device communication application executor 501) and the USB devices connected to the device control unit 30. As described above, in this embodiment of the invention the checkout clerk opens the communication path between the device communication application executor 501 and USB devices by a simple operation.

Before starting the transaction, the checkout clerk also boots the POS application on the tablet terminal 10 and instructs displaying a dedicated user interface UI (FIG. 4) on the touch panel 52. In response to this command, the POS application executor 502 of the terminal controller 50 displays the dedicated user interface UI.

Figure 4:
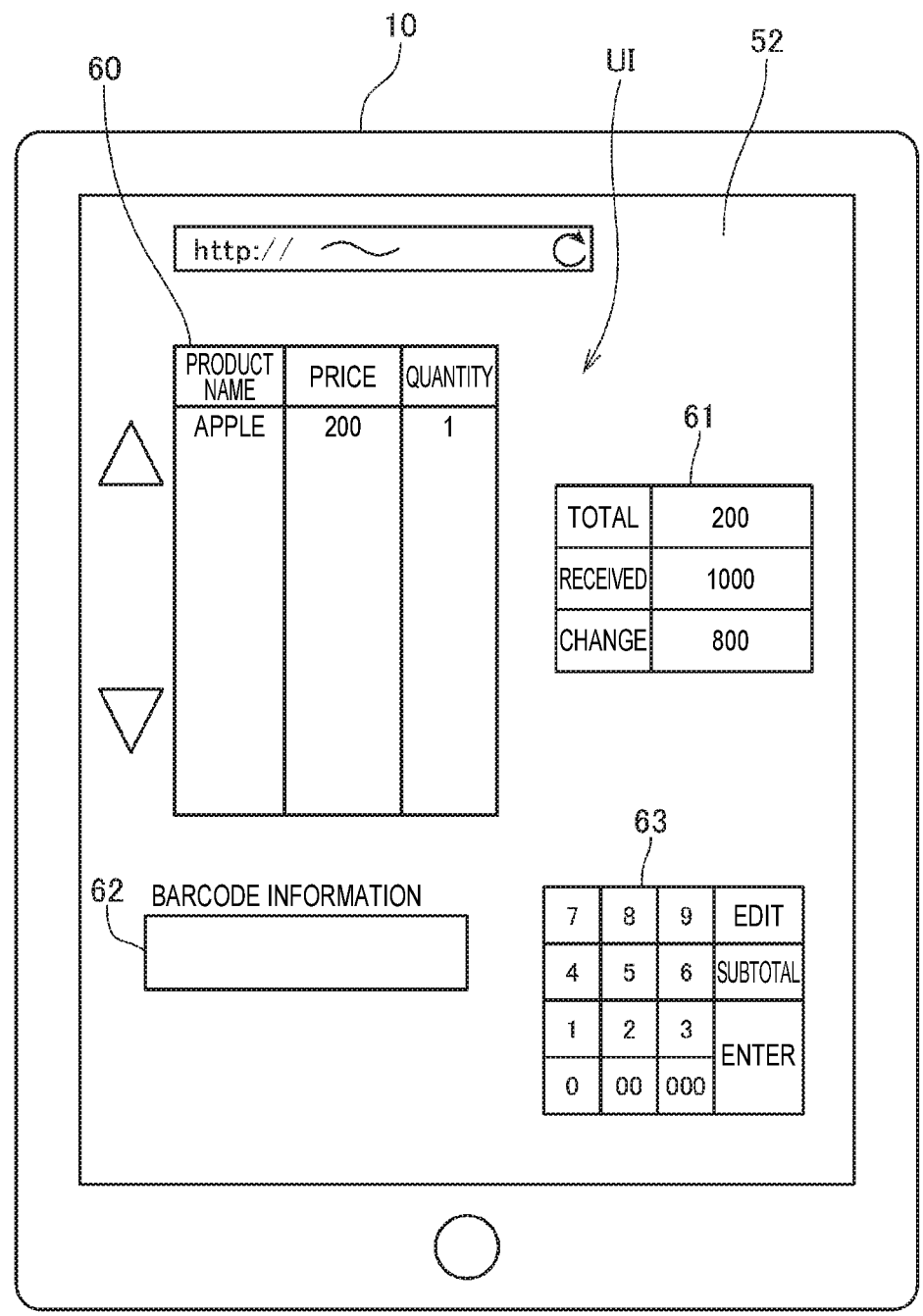
FIG. 4 shows a dedicated user interface.

FIG. 4 shows an example of the dedicated user interface that is displayed on the touch panel 52.

A list display area 60 where the names of the products being purchased by the customer, the prices of the products, and the quantities of the products are presented in a list is displayed at the top left of the dedicated user interface UI in FIG. 4. To the right of this list display area 60 is presented an amount display area 61 where the total amount of the products being purchased by the customer, the amount of money received from the customer in the transaction, and the amount of change due to the customer are displayed.

Below the list display area 60 is a barcode information display area 62 where information (referred to below as barcode information) expressed by the barcode that is read by the barcode scanner BR is displayed. The barcode information is basically the product code assigned to the product.

A virtual keypad 63 is displayed on the right side of the barcode information display area 62.

Operation of devices in the POS system 1 when a barcode is read by the barcode reader BR is described first.

Figure 5:
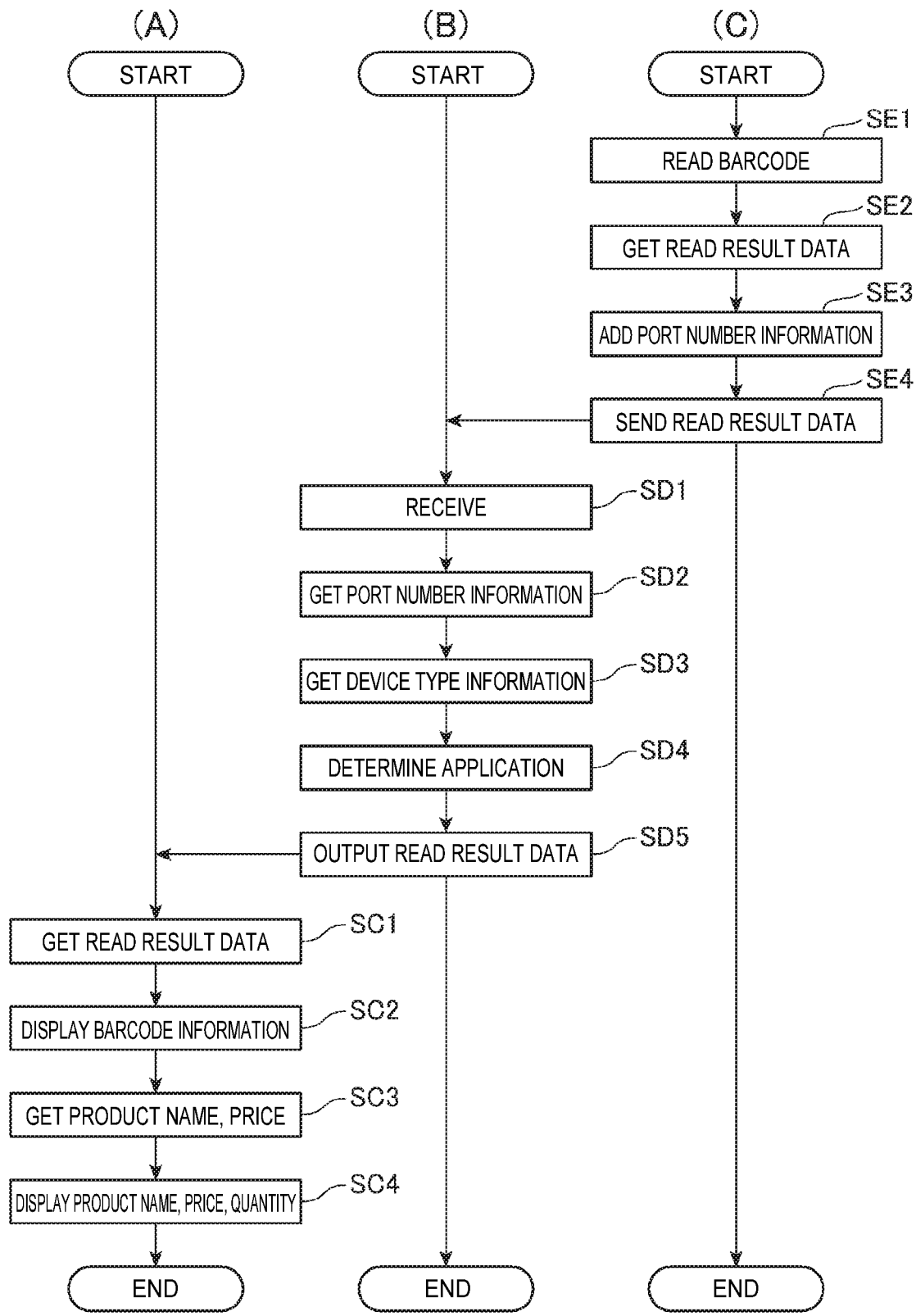
FIG. 5 is a flow chart of tablet terminal and device control unit operation.

FIG. 5 is a flow chart showing the operation of the tablet terminal 10 and printer 11 when a barcode is read by the barcode reader BR. FIG. 5 (A) shows the operation of the POS application executor 502 of the terminal controller 50 of the tablet terminal 10, and (B) shows the operation of the device communication application executor 501 of the tablet terminal 10. FIG. 5 (C) shows the operation of the device control unit 30 of the printer 11.

At the checkout counter L, the checkout clerk uses the barcode reader BR to read the barcode from the product or the packaging of the product purchased by the customer.

As shown in FIG. 5 (C), when the checkout clerk reads the barcode, the barcode reader BR outputs data based on the read result (referred to below as the read result data) by USB through the USB port P to which the barcode reader BR is connected (step SE1). The read result data is an example of the device data described above.

The device controller 31 then controls the USB interface 33 to acquire the read result data input through the specific USB port P (step SE2).

Next, the device controller 31 adds to the read result data the port number information indicating the port number of the USB port P to which the barcode reader BR is connected (step SE3).

Next, the device controller 31 sends the read result data through the device-to-device connection to the device communication application executor 501 (step SE4).

As shown in FIG. 5 (B), the device communication application executor 501 of the terminal controller 50 of the tablet terminal 10 controls the terminal-wireless LAN communicator 51 to receive the read result data (step SD1).

Next, the device communication application executor 501 acquires the port number information added to the device data received in step SD1 (step SD2).

Next, the device communication application executor 501 references the device control table 531 to acquire the device type information corresponding to the acquired port number information (step SD3). In this example, the device type information the device communication application executor 501 acquired in step SD3 is information indicating "device type: barcode reader" as the device type.

Next, the device communication application executor 501 determines the application corresponding to the device type indicated by the device type information acquired in step SD3 (step SD4). The application that should output the device data is previously determined for each device type. In this example, in step SD4, the device communication application executor 501 identifies the POS application as the application corresponding to the device type.

Next, the device communication application executor 501, using a specific API, outputs the read result data received in step SD1 to the POS application identified in step SD4 (step SD5).

As shown in FIG. 5 (A), the POS application executor 502 acquires the read result data the device communication application executor 501 output (step SC1).

Next, the POS application executor 502, based on the read result data, displays the barcode information in the barcode information display area 62 of the dedicated user interface UI (step SC2). In this example, the barcode information is information indicating the product code.

Next, the POS application executor 502, based on the product code indicated by the barcode information, acquires the product name and product price (step SC3).

The terminal storage 53 stores a table relationally storing for each product the product code, product name, and product price. In step SC3, the POS application executor 502 acquires the product name and product price based on this table. Note that the method of acquiring the product name and product price is not limited to this method. For example, the information may be acquired by querying an external server.

Next, the POS application executor 502, based on the product name and product price acquired in step SC3, displays a combination of the product name, product price, and product quantity in the list display area 60 of the dedicated user interface UI (step SC4).

By executing the process described above, a product code is displayed in the barcode information display area 62, and a combination of the product name, product price, and product quantity is displayed in the list display area 60, of the dedicated user interface UI in response to a product barcode being read with the barcode reader BR.

The flow of data and the processes of the devices when a barcode is read with the barcode reader BR is described above, but the flow of data and the processes of the devices when a credit card is read with the credit card reader CR is the same.

The operation of devices in the POS system 1 when producing a receipt according to a transaction at the checkout counter L is described next.

Figure 6:
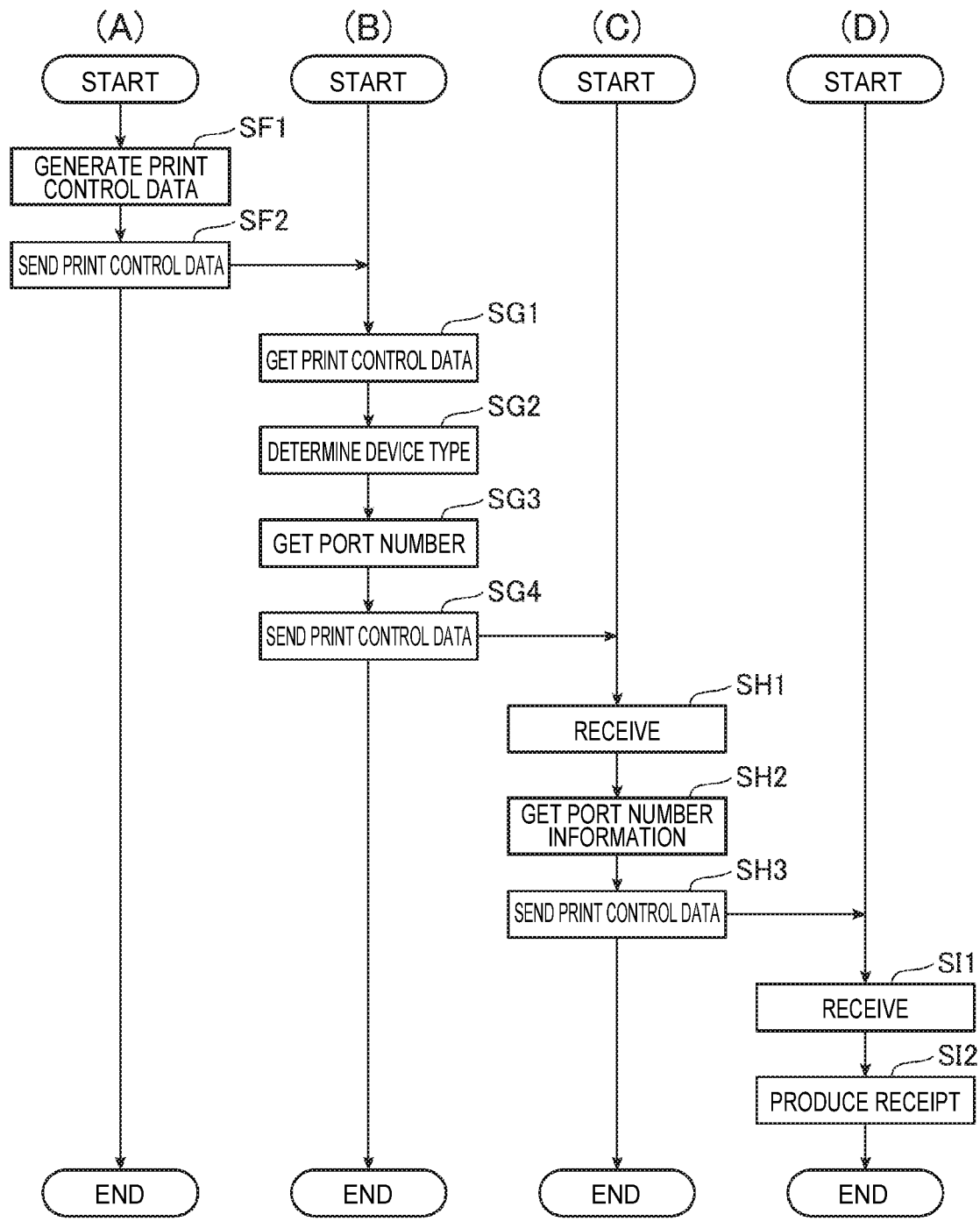
FIG. 6 is a flow chart of tablet terminal and printer operation.

FIG. 6 is a flow chart of the operation of the tablet terminal 10 and printer 11 when producing a receipt according to a transaction at the checkout counter L. FIG. 6 (A) shows the operation of the POS application executor 502 of the terminal controller 50 of the tablet terminal 10, and (B) shows the operation of the device communication application executor 501 of the tablet terminal 10. FIG. 6 (C) shows the operation of the device control unit 30 of the printer 11, and (D) shows the operation of the printing unit 20 of the printer 11.

As shown in FIG. 6 (A), the POS application executor 502 of the terminal controller 50 of the tablet terminal 10 generates print control data instructing producing a receipt printed with receipt information according to the transaction performed at the checkout counter L (step SF1). The receipt information includes, for example, a logo, information indicating when the receipt was produced, information related to the products purchased by the customer (such as the product name, price, and quantity), information indicating the subtotal, information indicating the tax, information indicating the transaction total, and information indicating the change due.

Next, the POS application executor 502, using a specific API, outputs the generated print control data to the device communication application executor 501 (step SF2).

As shown in FIG. 6 (B), the device communication application executor 501 acquires the print control data the POS application executor 502 output (step SG1).

Next, the device communication application executor 501 identifies the device type of the USB device to process the print control data (step SG2).

In this embodiment, the device type of the USB device that processes the data is previously defined for each type of data. In step SG2, the device communication application executor 501 acquires, for example, control information contained in the header of the data (the print control data in this example), identifies the type of data based on the control information, and identifies based on the type of data the device type of the USB device to process the data.

In this example, in step SG2, the device communication application executor 501 identifies "device type: print unit" as the device type.

Next, the device communication application executor 501 references the device control table 531 and acquires the port number information of the USB port to which the USB device of the device type identified in step SG2 is connected (step SG3).

Next, the device communication application executor 501 adds the port number information acquired in step SG3 to the print control data, and sends the port number information through the device-to-device connection to the device controller 31 (step SG4).

As shown in FIG. 6 (C), the device controller 31 of the device control unit 30 of the printer 11 controls the device-wireless LAN communicator 32 to receive the print control data (step SH1).

Next, the device controller 31 acquires the port number information that was added to the print control data received in step SH1 (step SH2).

Next, the device controller 31 sends the print control data to the printing unit 20 by USB through the USB port P of the port number indicated by the port number information acquired in step SH2 (in this example, the USB port P to which the printing unit 20 is connected) (step SH3).

As shown in FIG. 6 (D), the print controller 21 of the printing unit 20 of the printer 11 controls the printing unit communicator 23 to receive the print control data (step SI1).

Next, the print controller 21, based on the print control data received in step SI1, controls the print unit 22 to produce a receipt (step SI2).

The flow of data and the processes of the devices when a receipt is produced by the printing unit 20 as the USB device controlled by the tablet terminal 10 is described above, but the flow of data and the processes of the devices when the tablet terminal 10 controls the automatic change machine JT is the same.

As described above, the device control unit 30 (device control device) according to this embodiment has a USB interface 33 (device connector) that connects to a USB device (device); a tag reader 40 (reader) that reads an IC tag TG recording an external device address, which is the address of the tablet terminal 10 (external device), by near-field wireless communication; and a device controller 31 (controller) that sends a device control device address, which is its own address, to the external device address read by the tag reader 40 as the destination, and, if there is a request from the tablet terminal 10 to establish a communication path between the tablet terminal 10 and a USB device after sending the device control device address, establishes a communication path between the tablet terminal 10 and USB device.

In this configuration, the user simply holds the tablet terminal 10 near the printer 11 to open a communication path between the tablet terminal 10 and a USB device. More specifically, this configuration enables the printer 11 to easily establish a communication path between the tablet terminal 10 and a USB device connected to the device control unit 30 by using a near-field wireless communication capability.

Furthermore, after opening a communication path in this configuration, the device controller 31 sends data received from the tablet terminal 10 for controlling the USB device to the USB device, and sends data received from the USB device to the tablet terminal 10.

Thus comprised, data can be sent and received by asynchronous bi-directional communication between the tablet terminal 10 and USB devices.

Furthermore, after opening a communication path in this embodiment, the device controller 31 sends print control data received from the tablet terminal 10 to the printing unit 20.

Thus comprised, the tablet terminal 10 can send print control data by the communication path that was established and control the printing unit 20.

Yet further, after opening a communication path in this embodiment, the device controller 31 sends device data based on the read result received from the barcode reader BR or credit card reader CR (reading device) to the tablet terminal 10.

Thus comprised, when reading is done by the reading device, the tablet terminal 10 can acquire device data based on the read result through the communication path, and execute a corresponding process.

Embodiment 2

A second embodiment of the invention is described next.

Below, like parts in this and the first embodiment are identified by like reference numerals, and further description thereof is omitted.

Figure 7:
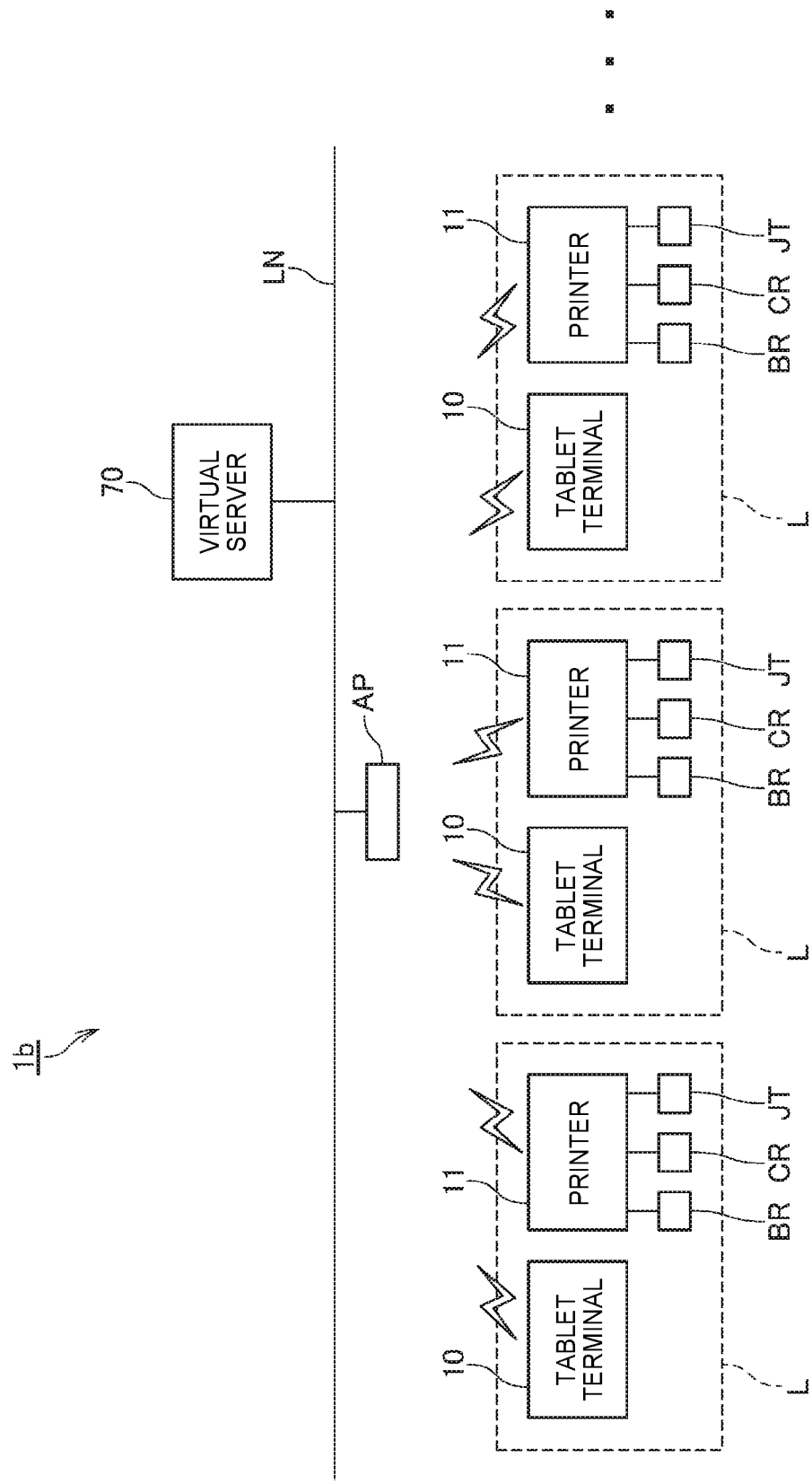
FIG. 7 illustrates a POS system according to a second embodiment of the invention.

As shown in FIG. 7, a virtual server 70 is connected to the local area network LN in POS system 1b. The tablet terminal 10 communicates through the local area network LN with the virtual server 70. The printer 11 communicates through the local area network LN with the virtual server 70.

In FIG. 7, one virtual server 70 is shown connected to the local area network LN in the POS system 1b, but multiple virtual servers 70 may be connected to the local area network LN.

Figure 8:
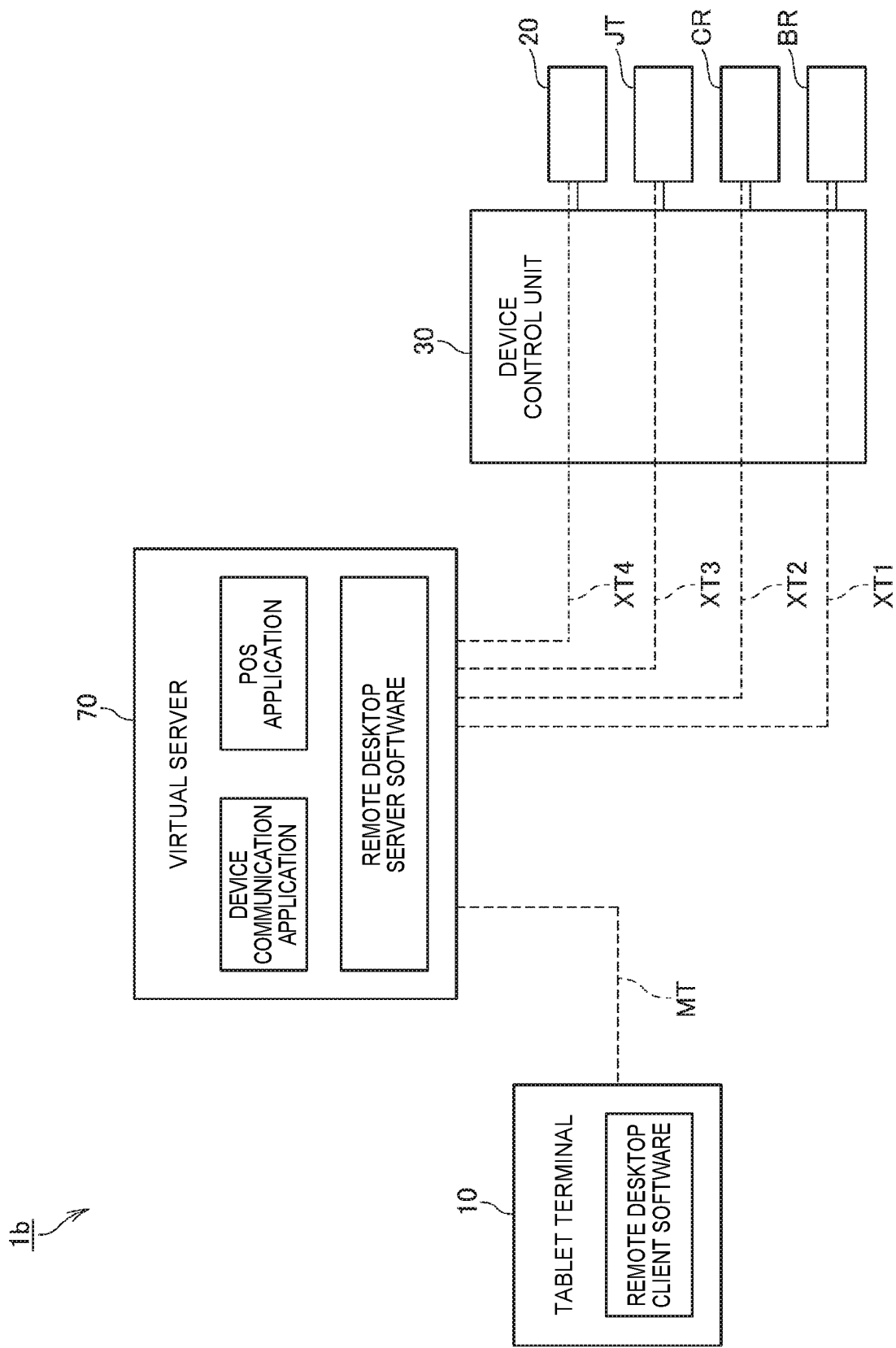
FIG. 8 illustrates the relationship between devices in the POS system.

FIG. 8 illustrates the relationship between the tablet terminal 10, printer 11, and the virtual server 70 disposed to the same local area network LN through the communication paths established between these devices. The software (applications) installed on the tablet terminal 10 and virtual server 70 are also shown in FIG. 8 in a form useful for description.

As shown in FIG. 8, remote desktop client software is installed on the tablet terminal 10, remote desktop server software is installed on the virtual server 70, and the tablet terminal 10 functions as a remote desktop client of the virtual server 70 as a remote desktop server.

As shown in FIG. 8, the device communication application and POS application described in the first embodiment are installed on the virtual server 70.

As shown in FIG. 8, a server-terminal communication path MT, which is a logical communication path, is established between the tablet terminal 10 and the virtual server 70.

The virtual server 70 sends display data as needed for displaying through the server-terminal communication path MT to the tablet terminal 10. The tablet terminal 10 receives the display data from the virtual server 70 through the server-terminal communication path MT, and based on the received display data displays a specific user interface (specific screen) on the touch panel 52. The user interface displayed on the touch panel 52 based on the display data is an example of a remote desktop.

When input to the user interface based on the display data received from the virtual server 70 is received, the tablet terminal 10 sends information corresponding to the input through the server-terminal communication path MT to the virtual server 70. Based on the information received from the tablet terminal 10, the virtual server 70 executes a corresponding computing process, and sends display data reflecting the process result to the tablet terminal 10.

As shown in FIG. 8, a server-device communication path XT, which is a logical communication path, is established between the virtual server 70 and the USB device connected to the device control unit 30 of the printer 11. More specifically, communication path XT1 is established between the virtual server 70 and barcode reader BR; communication path XT2 is established between the virtual server 70 and credit card reader CR; communication path XT3 is established between the virtual server 70 and automatic change machine JT; and communication path XT4 is established between the virtual server 70 and printing unit 20.

The virtual server 70 exchanges data with the USB devices by asynchronous bi-directional communication through the server-device communication path XT.

The virtual server 70 is a server provided for the following purpose.

That is, the POS application or other software for controlling the printer 11, and other software (referred to below as control software), may not be compatible with the operating system of the tablet terminal 10. In this event, control software is run on the virtual server 70 under the operating system that is compatible with the control software to enable control of the printer 11 and devices connected to the printer 11 by the control software. A further objective is to use remote desktop technology to enable the tablet terminal 10 to reference process results of the control software, and enable the tablet terminal 10 to assert instructions causing the control software to execute a specific process.

Figure 9:
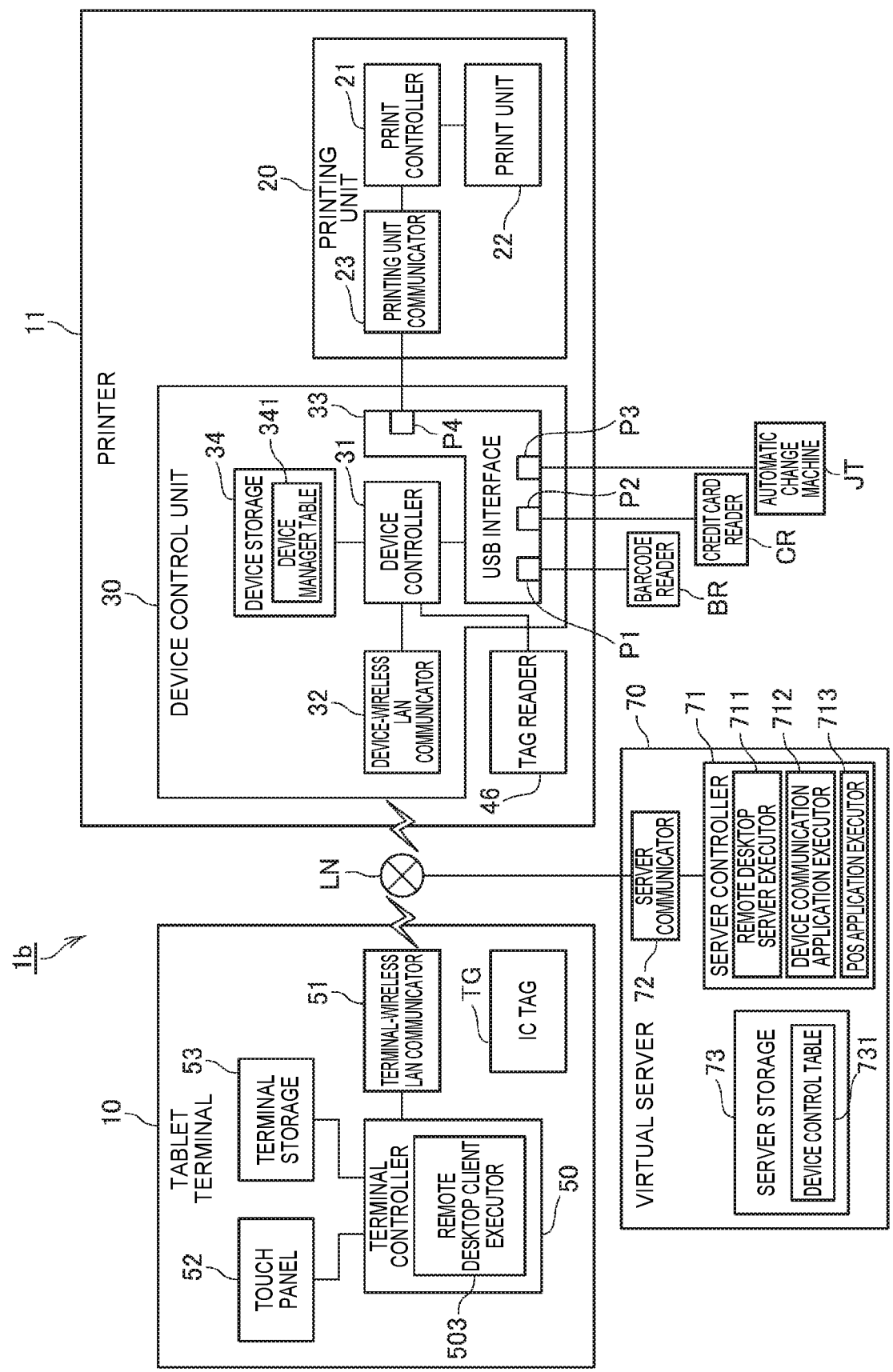
FIG. 9 is a block diagram illustrating the functional configuration of devices in the POS system.

FIG. 9 is a block diagram illustrating the functional configuration of the tablet terminal 10, printer 11, and virtual server 70 embodying the POS system 1b.

As shown in FIG. 9, the terminal controller 50 of the tablet terminal 10 functions as a remote desktop client executor 503 by reading and running the remote desktop client software.

As shown in FIG. 9, the virtual server 70 includes a server controller 71, server communicator 72, and server storage 73.

The server controller 71 has a CPU, ROM, RAM, and other peripheral circuits not shown, and controls the virtual server 70 by means of hardware and software, such as by the CPU executing a control program stored in ROM.

The server controller 71 functions as a remote desktop server executor 711 by reading and running remote desktop server software.

The server controller 71 also functions as a device communication application executor 712 by reading and running a device communication application.

The server controller 71 also functions as a POS application executor 713 by reading and running a POS application.

The server communicator 72 communicates as controlled by the server controller 71 with devices connected to the local area network LN according to a specific communication protocol.

The server storage 73 has memory and stores data.

The operation of devices in the POS system 1b when establishing a server-device communication path XT between the virtual server 70 and the USB devices connected to the device control unit 30 is described next.

There are three methods, first method to third method, of opening a server-device communication path XT. Operation of devices in the POS system 1b in each method is described below.

First Method

Figure 10:
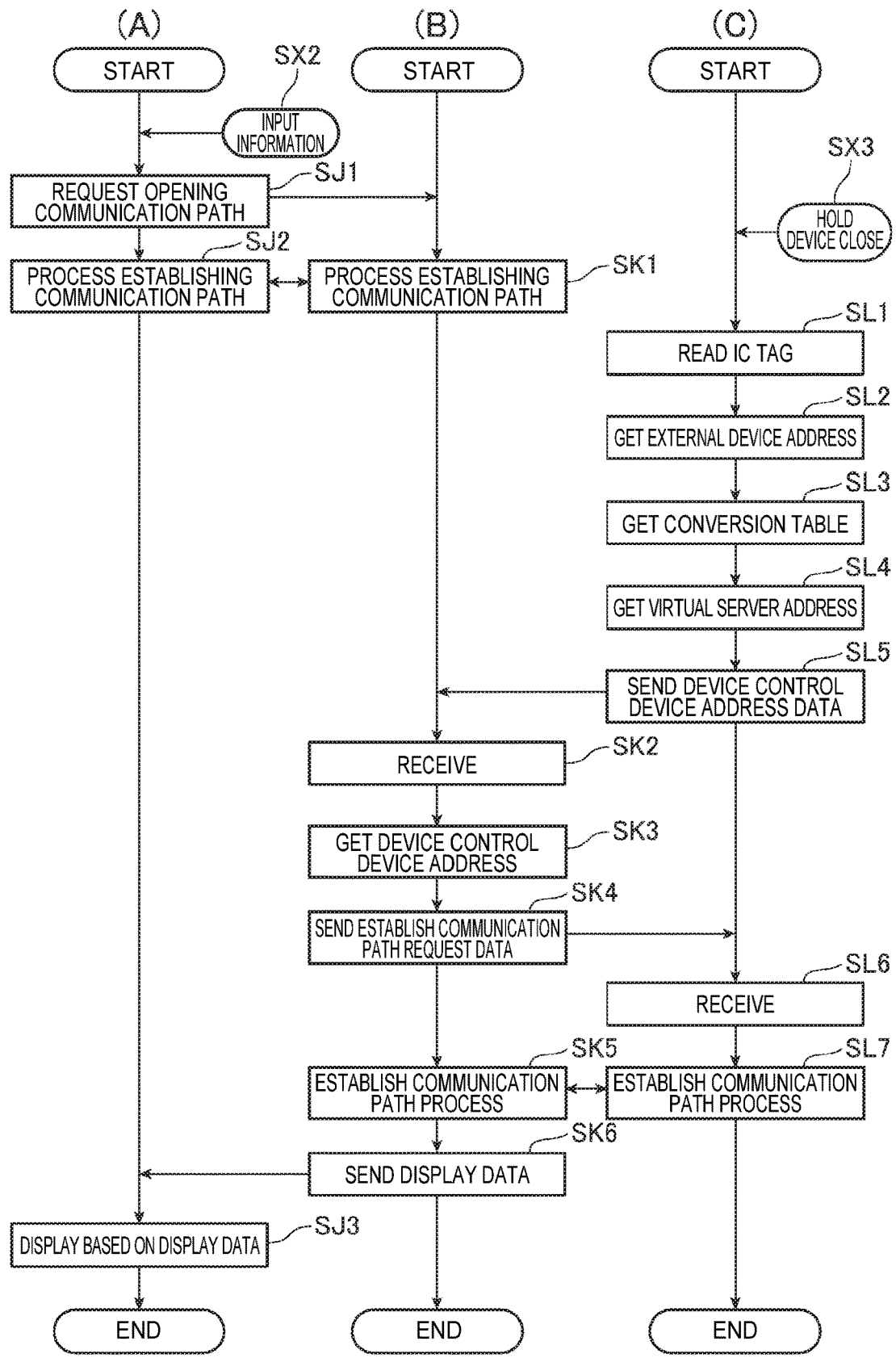
FIG. 10 is a flow chart of the operation of devices in the POS system.

FIG. 10 is a flow chart showing the operation of devices in the POS system 1b when opening a server-device communication path XT by the first method. FIG. 10 (A) shows the operation of the tablet terminal 10, (B) shows the operation of the virtual server 70, and (C) shows the operation of the device control unit 30 of the printer 11.

To establish a server-device communication path XT in the first method, the checkout clerk first starts the remote desktop client software of the tablet terminal 10. Next, the checkout clerk inputs information required to establish the server-terminal communication path MT, such as authentication information, to the user interface provided by the software (step SX2).

As shown in FIG. 10 (A), the remote desktop client executor 503 of the terminal controller 50 of the tablet terminal 10 requests the virtual server 70 to open a server-terminal communication path MT (step SJ1).

As shown in FIGS. 10 (A) and (B), in response to the request of step SJ1, the remote desktop client executor 503 and the remote desktop server executor 711 of the server controller 71 of the virtual server 70 exchange data required to establish a communication path according to the specific protocol related to the remote desktop, and open a server-terminal communication path MT between these function blocks (step SJ2, step SK1).

The checkout clerk also goes to the checkout counter L the clerk is assigned to, and holds the tablet terminal 10 near the printer 11, that is, within the near-field communication range of the IC tag TG and the tag reader 40 (step SX3).

To open a communication path between the virtual server 70 and a USB device connected to the device control unit 30, the checkout clerk (user) simply performs this simple task.

As shown in FIG. 10 (C), when the tablet terminal 10 is near the printer 11, the tag reader 40 of the printer 11 communicates by near-field wireless communication with the IC tag TG of the tablet terminal 10, reads the external device address data from the IC tag TG, and outputs to the device controller 31 (step SL1).

Based on the external device address data input from the tag reader 40, the device controller 31 acquires the external device address (step SL2).

Next, the device controller 31 references a conversion table (step SL3).

The conversion table is a table relationally storing, for each tablet terminal 10 used in the POS system 1b, the external device address of each tablet terminal 10, and the IP address of the virtual server 70 corresponding to each tablet terminal 10 (referred to below as the virtual server address).

A virtual server 70 corresponding to a particular tablet terminal 10 is the virtual server 70 that functions as a remote desktop server in relation to that one tablet terminal 10. In other words, the virtual server 70 is the virtual server 70 with which that one tablet terminal 10 establishes a server-terminal communication path MT by a function of the remote desktop client software.

The conversion table is defined by a program that is stored as data in the device storage 34, for example, and embodies the function of the device controller 31, for example. The content of the conversion table can be changed by the user by a specific means.

Next, the device controller 31, based on the conversion table, acquires the virtual server address corresponding to the external device address acquired in step SL2 (step SL4).

Next, the device controller 31 sends the device control device address data to the virtual server address acquired in step SL4 (step SL5).

In step SL5, the device control unit 30 establishes a connection according to a specific communication standard (referred to below as a server connection) with the device communication application executor 712 of the server controller 71 of the virtual server 70 according to a specific communication protocol, such as TCP. The device control unit 30 then sends the device control device address data to the virtual server 70 through the established server connection.

Thereafter, communication between the device control unit 30 and the device communication application executor 712 is carried through the established device-to-device connection.

As shown in FIG. 10 (B), the device communication application executor 712 of the server controller 71 of the virtual server 70 controls the server communicator 72 to receive the device control device address data (step SK2).

Next, the device communication application executor 712, based on the received device control device address data, acquires the device control device address (the IP address of the device control unit 30) (step SK3).

Next, the device communication application executor 712 sends open communication path request data to the device control device address acquired in step SK3 (step SK4).

As shown in FIG. 10 (C), the device controller 31 of the device control unit 30 controls the device-wireless LAN communicator 32 to receive the open communication path request data (step SL6).

Next, the device controller 31, based on the open communication path request data received in step SL6, communicates with the device communication application executor 712 to execute the establish communication path process (step SK5, step SL7).

In the establish communication path process of step SK5 and step SL7, the device controller 31 and device communication application executor 712 execute the following process.

In the establish communication path process of step SK5 and step SL7, the device controller 31 sends the device manager table 341 stored in the device storage 34 to the device communication application executor 712.

Based on the received device manager table 341, the device communication application executor 712 stores a table of the same content in the server storage 73 as a device control table 731.

Thereafter, the device communication application executor 712 communicates with the USB devices through the device controller 31 based on the device control table 731. As a result, a server-device communication path XT is established between the device communication application executor 712 and USB devices connected to the device control unit 30, and data can be sent and received by asynchronous bi-directional communication between the virtual server 70 and the USB devices.

More specifically, to control one USB device, the device communication application executor 712 references the device control table 731 to get the port number information of the USB port to which the one USB device to control is connected. Next, the device communication application executor 712 adds the acquired port number information to the control data for controlling the USB device, and sends it through the server connection to the device controller 31.

The device controller 31 receives the control data through the server connection, and acquires the port number information added to the control data. Next, the device controller 31 sends the control data according to the USB standard to the one USB device through the USB port P of the port number indicated by the acquired port number information. The one USB device receives the control data, and executes a process based on the control data.

When data is received from one connected USB device (referred to below as device data), the device controller 31 adds to the device data the port number information indicating the port number of the USB port P to which the one USB device is connected. Next, the device controller 31 sends the device data through the server connection to the device communication application executor 712.

The device communication application executor 712 receives the device data through the server connection, and acquires the port number information added to the received device data. Next, the device communication application executor 712 references the device control table 731 and acquires the device type information corresponding to the acquired port number information. The acquired device type information is information indicating the device type of the USB device that sent the device data. Next, the device communication application executor 712 outputs the device data using a specific API to the application (an application that processes device data sent by a device of that device type) corresponding to the device type indicated by the acquired device type information. The application processes the device data.

As shown in FIG. 10 (B), after server-device communication path XT is established, the device communication application executor 712 generates and sends to the tablet terminal 10 display data for displaying information related to the USB device that can communicate through that communication path (step SK6).

Information related to a USB device includes, for example, the vendor ID, product ID, device name information, and device type information of each USB device.

As shown in FIG. 10 (A), the remote desktop client executor 503 of the terminal controller 50 of the tablet terminal 10 displays the information related to the USB device on the touch panel 52 based on the display data (step SJ3).

The user can know what USB devices can be controlled by the tablet terminal 10 through the virtual server 70 by referring to the touch panel 52.

Second Method

The second method is described next.

Figure 11:
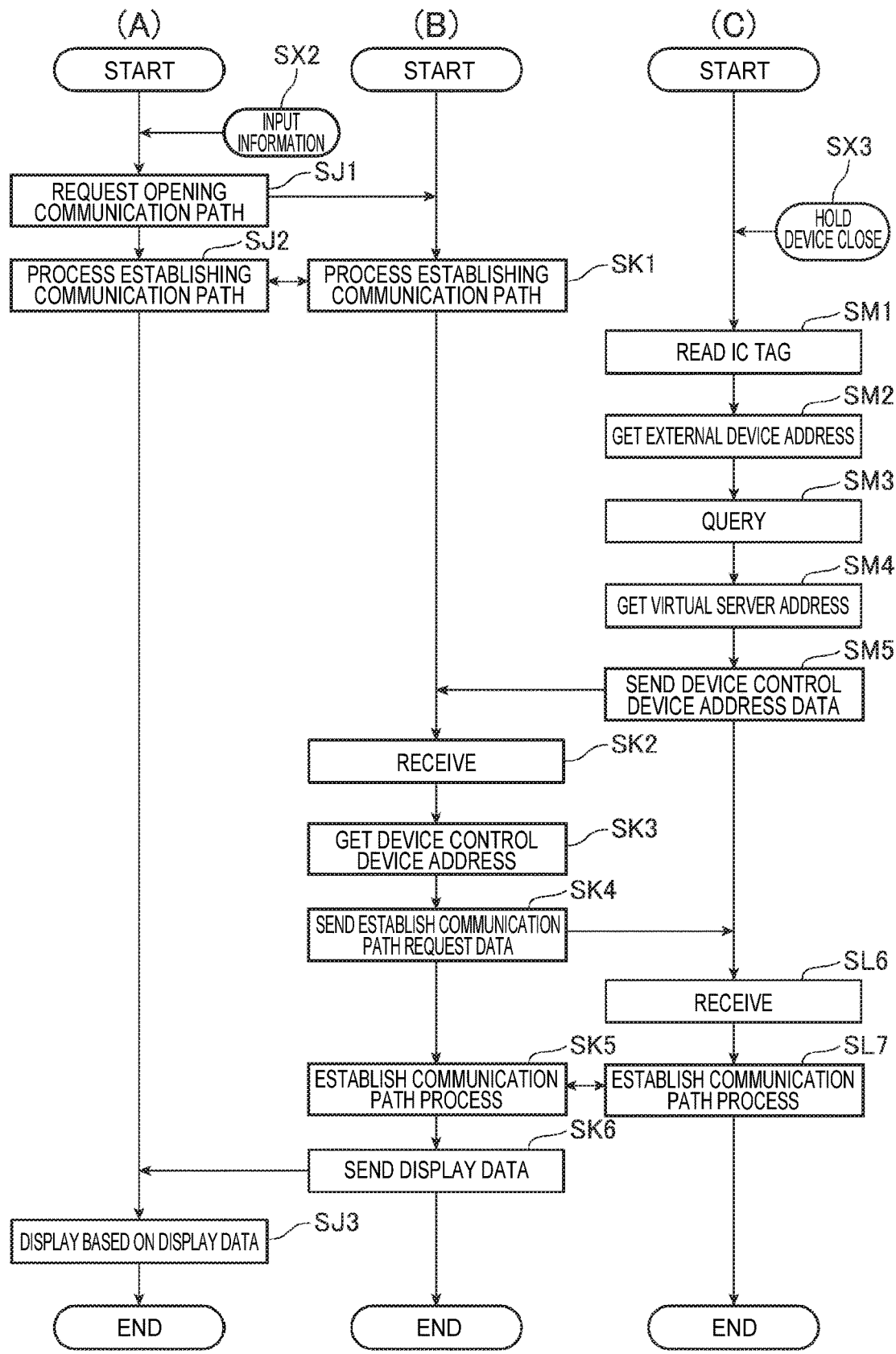
FIG. 11 is a flow chart of the operation of devices in the POS system.

FIG. 11 is a flow chart of the operation of devices in the POS system 1b when establishing an server-device communication path XT by the second method. FIG. 11 (A) shows the operation of the tablet terminal 10, (B) shows the operation of the virtual server 70, and (C) shows the operation of the device control unit 30 of the printer 11.

The second method differs from the first method described with reference to the flow chart in FIG. 10 in the operation of the device control unit 30 in step SL1 to step SL5. Steps that are the same as in the process shown in FIG. 10 therefore have the same reference numerals in FIG. 11, and further description thereof is omitted. Steps SM1 to SK5, which are executed instead of steps SL1 to SJ5 in FIG. 10, are described below.

In the second method, a table manager terminal (not shown in the figure) is connected to the local area network LN. The virtual server 70 can communicate with the table manager terminal through the local area network LN.

As shown in FIG. 11 (C), when the tablet terminal 10 is near the printer 11, the tag reader 40 of the printer 11 communicates by near-field wireless communication with the IC tag TG of the tablet terminal 10, reads the external device address data from the IC tag TG, and outputs to the device controller 31 (step SM1).

Based on the external device address data input from the tag reader 40, the device controller 31 acquires the external device address (step SM2).

Next, the device controller 31 communicates with the table manager terminal and queries the table manager terminal for the virtual server address corresponding to the external device address (step SM3).

For each tablet terminal 10 used in the POS system 1b, the table manager terminal relationally manages the external device address of each tablet terminal 10, and the virtual server address of the virtual server 70 corresponding to each tablet terminal 10. For example, the table manager terminal stores a table relating external device addresses and corresponding virtual server addresses, and manages the relationship between addresses by means of the table. The content of the table can be changed by the user using a specific means.

The table manager terminal also has a function for returning the virtual server address in response to a query for the virtual server address corresponding to the external device address.

The table manager terminal, in response to a query by the device controller 31 in step SM2, returns the corresponding virtual server address.

In step SM4, the device controller 31 acquires the virtual server address from the response corresponding to the query in step SM3 (step SM4).

Next, the device controller 31 sends the device control device address data to the virtual server address acquired in step SM4 (step SM5).

The second method is described above. Like the first method, the second method enables establishing a server-device communication path XT between the virtual server 70 and each USB device by the checkout clerk (user) performing a simple operation.

Third Method

The third method is described next.

Figure 12:
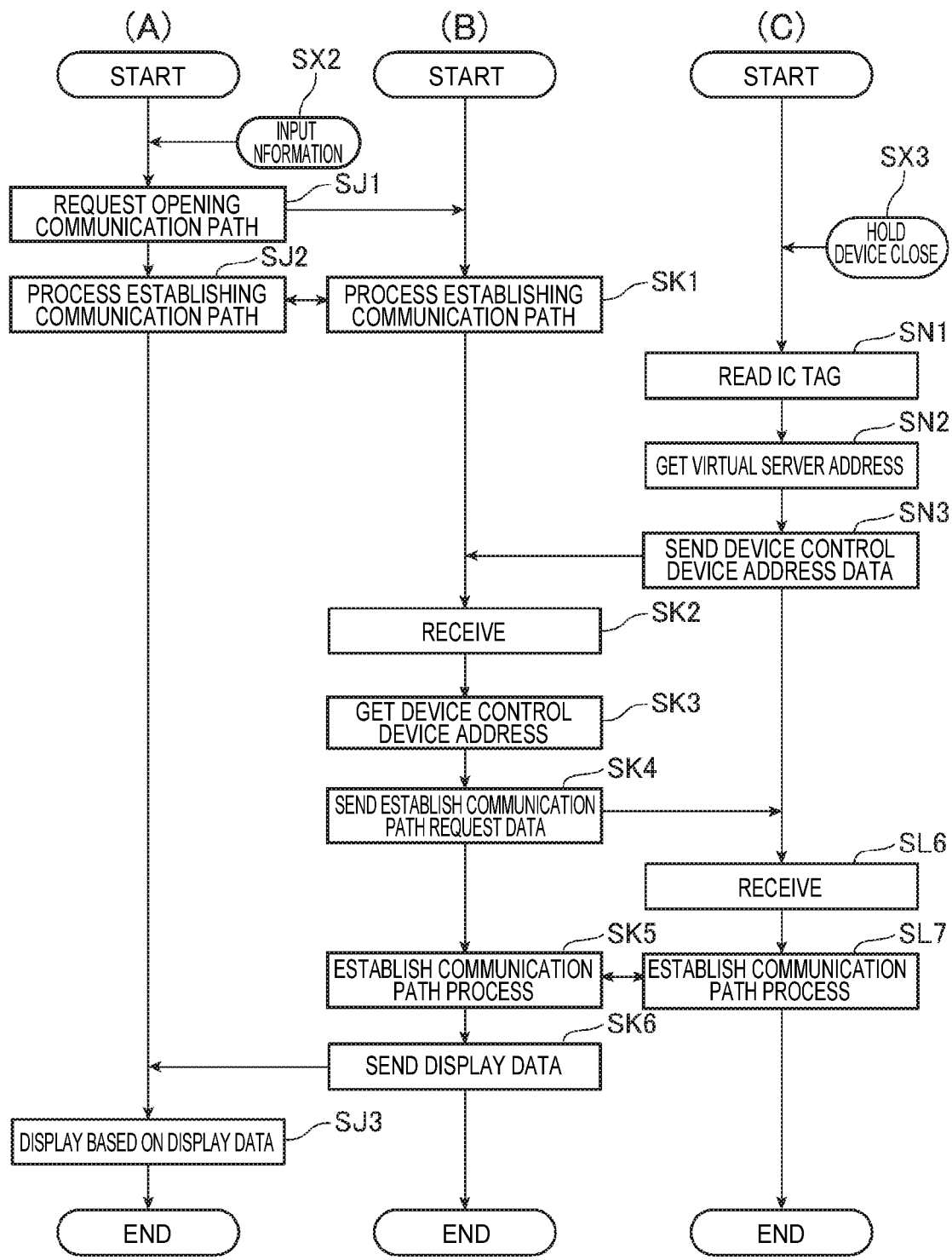
FIG. 12 is a flow chart of the operation of devices in the POS system.

FIG. 12 is a flow chart of the operation of devices in the POS system 1b when establishing an server-device communication path XT by the third method. FIG. 12 (A) shows the operation of the tablet terminal 10, (B) shows the operation of the virtual server 70, and (C) shows the operation of the device control unit 30.

The third method differs from the first method described with reference to the flow chart in FIG. 10 in the operation of the device control unit 30 in step SL1 to step SL5. Steps that are the same as in the process shown in FIG. 10 therefore have the same reference numerals in FIG. 12, and further description thereof is omitted. Steps SN1 to SN3, which are executed instead of steps SL1 to SJ5 in FIG. 10, are described below.

In the third method, the IC tag TG of each tablet terminal 10 stores virtual server address data indicating the IP address (virtual server address) of the virtual server 70 corresponding to that tablet terminal 10.

As shown in FIG. 12 (C), when the tablet terminal 10 is near the printer 11, the tag reader 40 of the printer 11 communicates by near-field wireless communication with the IC tag TG of the tablet terminal 10, reads the virtual server address data from the IC tag TG, and outputs to the device controller 31 (step SN1).

Based on the virtual server address data input from the tag reader 40, the device controller 31 acquires the virtual server address (step SN2).

Next, the device controller 31 sends the device control device address data to the virtual server address acquired in step SN2 (step SN3).

A third method is described above. Like the first method, the second method enables establishing a server-device communication path XT between the virtual server 70 and each USB device by the checkout clerk (user) performing a simple operation.

The invention is described above with reference to preferred embodiments thereof, but the invention is not limited thereto and can be modified and adapted in many ways without departing from the scope of the accompanying claims.

For example, specific examples of devices connected to the device control unit 30 are described above. However, the devices connected to the device control unit 30 are not limited to the examples described above.

Furthermore, in the foregoing embodiments the devices connected to the device control unit 30 are USB devices using the USB standard. However, the standard used by the device control unit 30 and the devices is not limited to USB.

Yet further, the printing unit 20 of the printer 11 (a device with a printing capability) is a thermal printer in the above embodiments, but the printing method of the printing unit 20 is not limited to an inkjet method, and an inkjet or dot impact method, for example, may be used.

The function blocks described above with reference to the figures can be embodied as desired by the cooperation of hardware and software, and do not suggest a specific hardware configuration.

INDUSTRIAL APPLICABILITY

As described above, the invention is useful for a printing device having a near-field wireless communication capability to establish a communication path between an external device and a device using the configuration with the near-field wireless communication capability.

REFERENCE SIGNS LIST

1 POS system (communication system)
10 tablet terminal (external device, remote desktop client)
20 printing unit (device)
30 device control unit (device control device)
31 device controller (controller)
33 USB interface (device connector)
40 tag reader
70 virtual server (remote desktop server)
BR barcode reader (device, reader)
CR credit card reader (device, reader)
JT automatic change machine (device)
TG IC tag

The invention claimed is:

1. A printer comprising:
   a device connector configured to connect to a transaction processing device;
   a reader configured to read, by near-field wireless communication, an integrated circuit (IC) tag of a terminal device, the IC tag storing an address of a control device, the control device being different from the terminal device;
   a print unit configured to print on a recording medium based on print control data instructing printing specific information on a recording medium; and
   a controller configured to:
      receive the address of the control device read by the reader,
      send a printer address of the printer to the address of the control device,
      establish an asynchronous bi-directional communication path between the control device and the transaction processing device in response to receiving a request for the communication path from the control device, and
      control the device connector, the reader, and the print unit.

2. The printer described in claim 1, wherein the controller is configured to:
   send data received from the control device for controlling the transaction processing device to the transaction processing device, after establishing the communication path, and
   send data received from the transaction processing device to the control device.

3. The printer described in claim 1, wherein:
   the transaction processing device is the print unit; and
   the controller is configured to receive the print data from the control device, and to send the print control data received from the control device to the print unit, after establishing the communication path.

4. The printer described in claim 1, wherein:
   the transaction processing device includes a reader configured to generate read result data; and
   the controller is configured to send the read result data device data to the control device, after establishing the communication path.

5. A communication system comprising:
   a transaction processing device;
   a terminal device comprising an integrated circuit (IC) tag storing an address of a control device, the control device being different from the terminal device; and
   a printer including:
      a device connector configured to connect to the transaction processing device;
      a reader configured to read, by near-field wireless communication, the address of the control device stored in the IC tag;
      a print unit configured to print on a recording medium based on print control data instructing printing specific information on a recording medium; and
      a controller configured to:
         receive the address of the control device read by the reader,
         send a printer address of the printer to the address of the control device,
         establish an asynchronous bi-directional communication path between the control device and the transaction processing device in response to receiving a request for the communication path from the control device, and
         control the device connector, the reader, and the print unit.

6. The communication system described in claim 5, wherein:
   the communication system comprises a remote desktop server configured to provide a remote desktop; and
   the control device is the remote desktop server, and the terminal device is a remote desktop client.

7. A control method of a printer that connects to a transaction processing device, comprising:
   reading, by near-field wireless communication, an integrated circuit (IC) tag of a terminal device storing an address of a control device, the control device being different from the terminal device;
   sending a printer address of the printer to the address of the control device;
   establishing an asynchronous bi-directional communication path between the control device and the transaction processing device in response to receiving a request for the communication path from the control device; and
   printing on a recording medium based on print control data instructing printing specific information on a recording medium.

8. The control method of a printer described in claim 7, wherein:
   the control device is a remote desktop server that provides a remote desktop, and the terminal device is a remote desktop client.

* * * * *